(No Model.)
P. G. GIROUD.
FISHING REEL.
No. 405,731. Patented June 25, 1889.
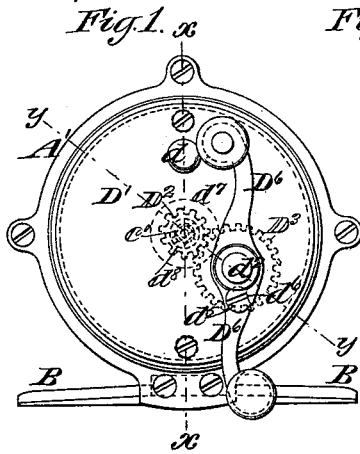
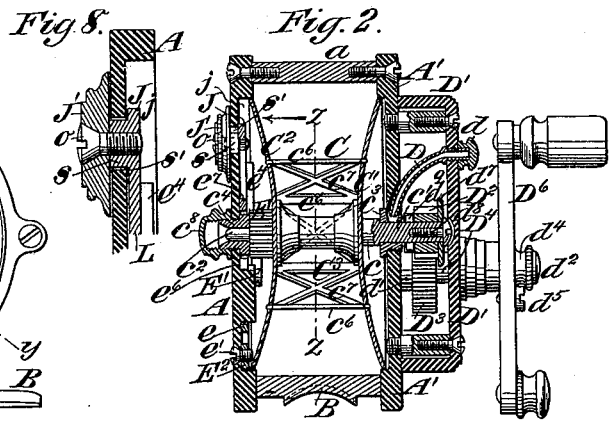
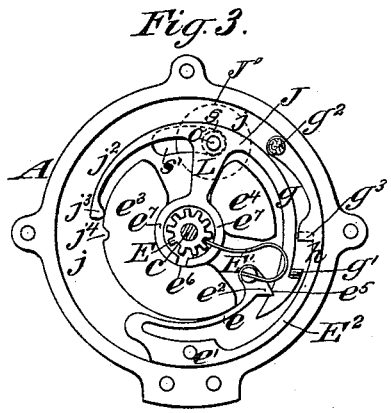
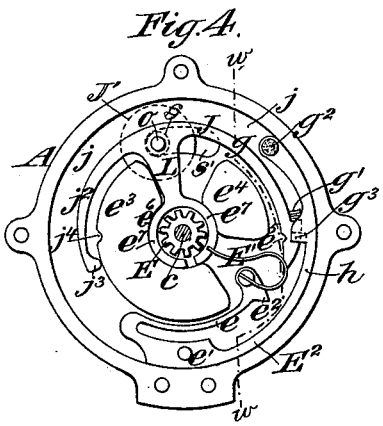
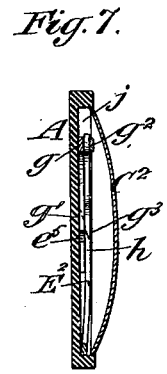
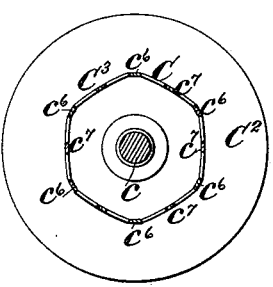
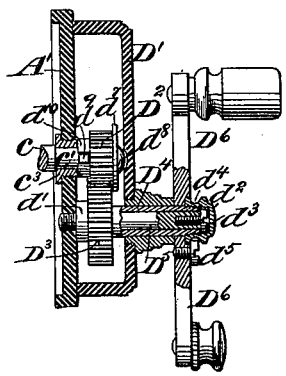
Witnesses:
O. E. Sundgren
John Bicker
Inventor:
Peter G. Giroud
by his Attorneys
Brown & Griswold

UNITED STATES PATENT OFFICE.

PETER G. GIROUD, OF NEW YORK, N. Y., ASSIGNOR TO THOMAS B. MILLS, OF SAME PLACE.

FISHING-REEL.

SPECIFICATION forming part of Letters Patent No. 405,731, dated June 25, 1889.

Application filed October 20, 1888. Serial No. 288,644. (No model.)

*To all whom it may concern:*

Be it known that I, PETER G. GIROUD, of New York, in the county of New York and State of New York, have invented a new and useful Improvement in Fishing-Reels, of which the following is a specification, reference being had to the accompanying drawings.

I will describe in detail a fishing-reel embodying my improvement, and then point out the novel features in claims.

In the accompanying drawings, Figure 1 is a side elevation of a reel embodying my improvement. Fig. 2 is a vertical section taken on the line $xx$, Fig. 1. Fig. 3 is a view of one of the reel-heads removed, looking in the direction of the arrow, Fig. 2. Fig. 4 is a similar view showing the parts in a different position from that shown in Fig. 3. Fig. 5 is a section of the reel-box, taken on the line $yy$, Fig. 1. Fig. 6 is a transverse section of the reel-spool, taken on the line $zz$, Fig. 2. Fig. 7 is a vertical section of one of the reel-heads on the line $ww$, Fig. 4. Fig. 8 is a sectional detail, on a larger scale, of a certain button and its connections employed in the reel.

Similar letters of reference designate corresponding parts in all the figures.

A A' designate reel-heads. These reel-heads may be secured together by pillars or posts $a$, in the usual manner, and by a base-piece B, which is secured between the reel-heads, as shown, by means of screws. By preference the reel-heads A A' will be made of india-rubber, gutta-percha, or analogous material.

C designates the reel-spool, composed of the heads $C'$ $C^2$, which may be of the ordinary construction. These spool-heads are rigidly mounted upon a spindle $c$, provided with journals $c'$ $c^2$. These journals have bearings, in this example of my improvement, in metal bushings $c^3$ $c^4$, screw-threaded or otherwise secured in the heads A A'. In order to conduce to the lightness of the reel-spool, I prefer to provide the same with a skeleton barrel $C^3$, upon which the fishing-line may be wound. This barrel is composed of bars $c^6$, extending approximately parallel with the axis of the spool, and secured at their ends within suitable apertures in the spool-heads $C'$ $C^2$. Between the bars $c^6$ extend diagonally-arranged braces $c^7$.

By reference more particularly to Fig. 6 it will be seen that the diagonally-extending braces $c^7$ are slightly curved outwardly between the bars $c^6$, whereby sharp angles of the barrel, which might occur at the bars $c^6$, are avoided. This construction is advantageous because it not only makes a light spool, but also one which is at the same time very strong. The bushing $c^4$ protrudes for a distance beyond the exterior of the head A of the reel, and is screw-threaded to receive a hollow nut or cap $c^8$. In order to oil the journal $c^2$, it is but necessary to remove the cap $c^8$. The cap $c^8$ protects the journal from dust and dirt. The other journal $c'$ for the spindle is oiled through a tube D, shown as curved and extending near one end to the exterior of the box D', and near its other end through suitable openings in the head A' and bushing $c^3$ into close proximity to the journal $c'$. A screw-threaded cap $d$ is adapted to close the outer end of the tube D. Oil may be poured through the tube D onto the journal $c'$ upon the removal of the cap $d$.

Rotary motion is imparted to the reel-spool by pinions $D^2$ $D^3$, arranged in the box D'. The pinion $D^3$ is mounted upon a shaft $D^4$, in this instance shown as formed of a hollow tube. The shaft $D^4$ surrounds loosely a pin or stud $D^5$, and may be turned freely about the same. The pin or stud $D^5$ is rigidly secured to the head A', as shown, by means of screw-threads. Between the pinion $D^3$ and the head A', I prefer to arrange a washer $d'$.

$D^6$ designates a handle of ordinary construction arranged upon the shaft $D^4$, outside the box D'. By rotating this handle motion will be transmitted through the pinions $D^2$ $D^3$ to the reel-spool. I have shown the handle as secured upon the shaft $D^4$ by means of a hollow clamping nut or cap $d^2$, having a screw-threaded connection with the outer end of the shaft $D^4$, and entering at its inner end a suitably-formed recess in the handle $D^6$. The cap $d^2$ wholly incloses the outer ends of the shaft $D^4$ and the stud $D^5$, as also the head of the screw $d^3$, engaging the outer end of the stud $D^5$, and operating to prevent longitudinal movement of the shaft $D^4$ upon the stud $D^5$. Beyond the handle $D^6$ the cap $d^2$ is provided with an annular grooved or undercut portion $d^4$. Having a connection with the handle $D^6$, adjacent to the cap $d^2$, is a locking device $d^5$. This locking device is shown as a screw, the screw-threaded portion of which engages the handle $D^6$. The head of the screw, as shown more clearly in Fig. 1, has a cut-away portion $d^6$ upon its periphery. Such cut-away portion is preferably inwardly-curved or arc-shaped. In Figs. 1 and 5 I have shown the head of the screw $d^5$, so rotated that it will extend into the annular groove $d^4$ on the cap $d^2$. When in this position, it will be clear that the cap $d^2$ will be locked against outward movement. The lock therefore serves to prevent detachment of the handle $D^6$. If, however, the screw $d^5$ be so rotated that its cut-away portion $d^6$ will be opposite the cap $d^2$, the cap, and consequently the handle $D^6$, may be readily removed.

The pinion $D^2$ is detachably secured upon the journal $c'$, in this instance by means of a washer $d^7$ arranged upon the journal $c'$, outside the pinion $D^2$. A screw $d^8$, engaging the outer end portion of the journal $c'$, serves to prevent the pinion $D^2$ and washer $d^7$ from being moved longitudinally off from the journal $c'$. I have shown the journal $c'$, outside the head $A'$, as provided with pins or projections $d^9$, engaging suitably-formed notches in a hub $d^{10}$ upon the pinion $D^2$, whereby independent rotary motion of the pinion $D^2$ is prevented.

The outer end portion of the journal $c'$ may be squared, as shown in dotted outline in Fig. 1, to receive a squared aperture within the washer $d^7$ to prevent independent motion of said washer. In fact the portion of the journal $c'$ outside the head $A'$ may be squared throughout its length and extend through a squared aperture in the pinion $D^2$, in which case the pins or projections $d^9$ and the notches in the hub $d^{10}$ receiving said pins might be omitted. The diameter of the washer $d^7$ is such that it will overlap the pinion $D^3$. By this means, even if the handle $D^6$ and the box $D'$ were removed, the pinion $D^3$ would be prevented from being moved off from the stud $D^5$.

Referring now more particularly to Figs. 3, 4, and 7, E designates a click-wheel rigidly mounted upon the spindle $c$ outside the reel-spool and adjacent to the journal $c^2$. This click-wheel is shown as in the form of a pinion. It rotates with the spindle $c$. $E'$ designates a click-spring adapted to be brought into and out of engagement with the click-wheel $E$, in order to render the click operative or inoperative. This click-spring is secured near one of its ends upon a resilient arm $e$ of a metal piece $E^2$, which metal piece is in turn secured, as at $e'$, to the head A of the reel by a screw or otherwise. The arm $e$ of the metal piece $E^2$ is free to be moved inwardly, or toward and from the click-wheel $E$, and thus to carry the click-spring $E'$ into or out of engagement with the click-wheel $E$. Normally it occupies such a position that the click-spring will be out of engagement with the click-wheel, as shown more clearly in Fig. 4. Upon the arm $e$ is a tooth $e^2$. J designates a cam adapted to be moved circumferentially within an annular recess $j$, formed upon the interior of the head A. This cam comprises in the example shown three arms. One of these arms $j^2$ is curved to extend about an elevated portion $e^3$ upon the interior of the head A, and it is provided with a tooth or projection $j^3$, adapted, when the cam has been rotated into a certain position, to engage a notch $j^4$ in the outer edge of the elevated portion $e^3$. When the tooth $j^3$ is in engagement with the notch $j^4$, a stop is formed whereby the accidental rotation of the cam J is prevented. The arm $g$ of the cam J is curved to extend about a raised portion $e^4$ upon the interior of the head A. When the cam J is rotated into the position shown more clearly in Fig. 3, it contacts with the tooth $e^2$ upon the arm $e$ and exerts a cam-like action, whereby the arm $e$ is forced inwardly in such manner that the click-spring $E'$ will engage the click-wheel E. When in such position, the tooth $e^2$ engages a notch $e^5$ upon the cam J, whereby a stop is formed which prevents the accidental rotation of the cam. The outer edge of the arm $g$ of the cam is provided with a beveled tooth $g'$.

The metal piece $E^2$ has formed with it a curved drag-arm $h$, extending through the recess $j$ in the head A. The free end of this drag-arm is provided with a drag-pad $g^2$. Upon the inner edge of the drag-arm $h$ is a beveled tooth $g^3$. When the cam J is rotated into the position shown more clearly in Figs. 4 and 7, the beveled tooth $g'$ will be passed under the beveled tooth $g^3$, whereby the drag-arm $h$ will be sprung outwardly and the drag-pad $g^2$ will be caused to bear against the adjacent head $C^2$ of the reel-spool. The frictional contact between the beveled teeth $g'$ $g^3$ operates as a stop to prevent the accidental rotation of the cam J when the parts occupy the position just described. When in this position, also, it will be observed that the cam J is not in contact with the arm $e$ of the metal piece $E^2$, and the arm $e$ is therefore moved to disengage the click-spring from the click-wheel. When, therefore, the click is in operation, the drag is out of contact with the reel-spool, and vice versa. When the cam J has been rotated into such a position that the tooth $j^3$ engages the notch $j^4$, neither the click nor the drag will be in operation, and the reel-spool may then be rotated freely.

Between the elevated portions $e^3$ $e^4$ of the head A is a circular recess $e^6$, within which is arranged the click-wheel E. Between the click-wheel E and the walls of the recess $e^6$, formed by the raised portions $e^3$ $e^4$, are arranged arc-shaped spring arms or jaws $e^7$, formed integral with an arm L, constituting a part of the cam J, and extending in this instance radially from the axis of the click-wheel. The spring-arms $e^7$ constitute a hub for the cam and bind against the walls of the recess $e^6$, and thus act as brakes to retard the rotation of the cam J. Of course, if the bushing $c^4$ were of sufficient diameter and the spring-arms $e^7$ should be sprung about the bushing so as to grip it, the result would be the same.

Rotary motion is imparted to the cam J by means of a button J', arranged upon the outside of the head A. The cam J is provided with a hollow shank s, extending therefrom and through an arc-shaped slot s' to the exterior of the head A. A screw o, extending from the button to the shank s and engaging the cam J, serves to secure the button in place. I prefer that the shank s shall be of such length that it will extend somewhat beyond the exterior of the head A, whereby the button J' will be prevented from binding tightly against the head A, it being understood that the button J' has a flush inner surface. By grasping the button J' and moving it in either direction, as required, the cam J may be rotated.

What I claim as my invention, and desire to secure by Letters Patent, is—

1. In a fishing-reel, a reel-spool provided with heads and a barrel, the said barrel being composed of substantially parallel cross-bars and intermediate diagonally-extending braces, substantially as specified.

2. In a fishing-reel, the combination, with a reel-spool, of a spindle upon which said spool is mounted, heads for the reel, a box secured to one of said heads, and a tube extending to the exterior of said box and in close proximity to one of the journals of said spindle for supplying oil to said journal, substantially as specified.

3. In a fishing-reel, the combination, with a spool, of a spindle upon which said spool is mounted, a pinion on said spindle, a shaft, a second pinion on said shaft engaging the pinion first named, and a washer on the spool-spindle operating to maintain the first-named pinion in position and to overlap the pinion last named, substantially as specified.

4. In a fishing-reel, the combination, with a hollow shaft, of a pinion on said shaft, a stud about which said shaft may turn, a handle, and a cap securing said handle in position on the shaft and inclosing the outer ends of the shaft and studs, substantially as specified.

5. In a fishing-reel, the combination, with a shaft and a handle, of a cap inclosing the outer end of the shaft, and a lock on the handle adapted to engage said cap to prevent its removal, substantially as specified.

6. In a fishing-reel, the combination, with a spool, of a click-wheel, a click-spring, a resilient arm upon which said click-spring is mounted, a drag-arm, and a single cam adjacent to the drag and the click-spring and adapted to be rotated so as to alternately operate the click and the drag, substantially as specified.

7. In a fishing-reel, the combination, with a spool, of a click-wheel, a click-spring, a resilient arm upon which said click-spring is mounted, a resilient drag-arm and a cam adjacent to said click-spring and drag adapted when rotated to contact alternately with said resilient arms to render the click-spring and drag alternately operative, and when rotated still further to be removed from contact with both said resilient arms in order to render inoperative both the click-spring and the drag, substantially as specified.

8. In a fishing-reel, the combination, with a spool, of a click-wheel, a click-spring, a resilient arm upon which said click-spring is mounted, and a drag-arm, the said arm upon which the click-spring is mounted and the drag-arm being made in one integral piece, substantially as specified.

9. In a fishing-reel, the combination, with a spool, of a reel-head provided with a recess upon its inner side, as $e^6$, a click-wheel within said recess, a click-spring operating in conjunction with the click-wheel, a cam for operating the click-spring, and a hub on said cam composed of resilient jaws or arms arranged in said recess and maintaining the cam by friction, substantially as specified.

10. In a fishing-reel, the combination, with a head provided with an arc-shaped slot and having a recess upon its inner side, of a cam within said recess, a shank upon said cam extending to the exterior of said head, and a button secured upon said shank, said shank being of such length that it will extend beyond the exterior surface of the head, substantially as and for the purpose specified.

PETER G. GIROUD.

Witnesses:
FREDK. HAYNES,
ARTHUR H. GAMBLIN.